Figure 1:
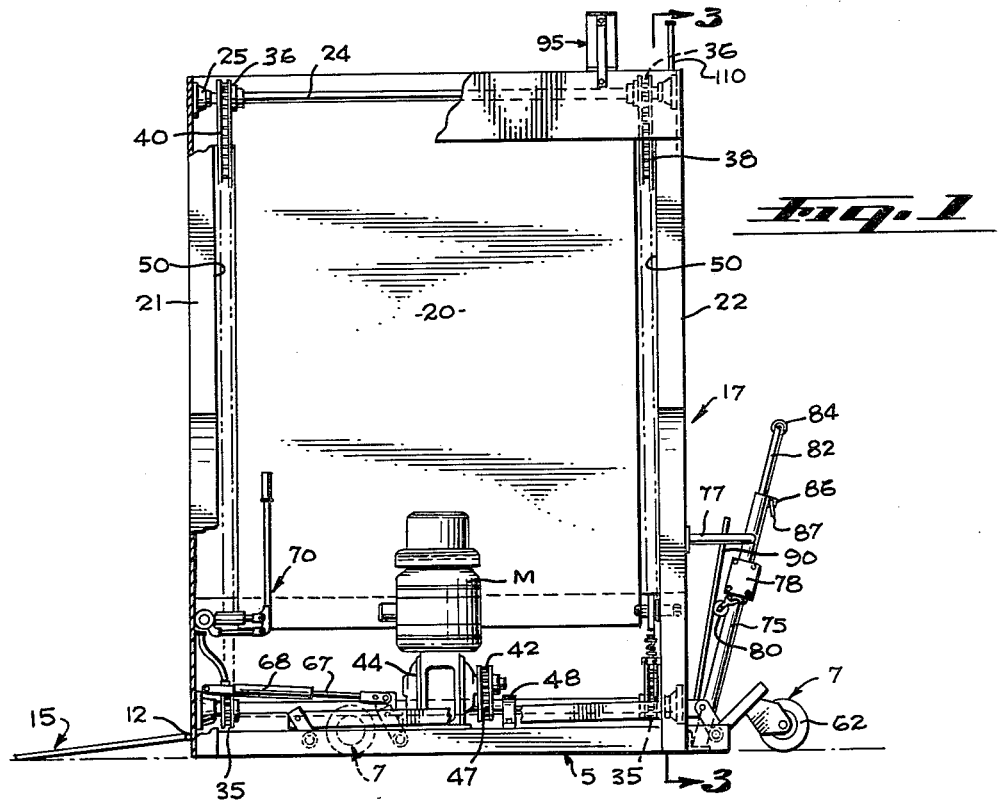

Sept. 18, 1962 R. E. FLEMING 3,054,519
TRUCK LOADING ELEVATOR DEVICE FOR HANDLING HAND TRUCKS
Filed Jan. 17, 1961 3 Sheets-Sheet 1

RICHARD E. FLEMING
INVENTOR.

BY Mason + Graham
ATTORNEYS

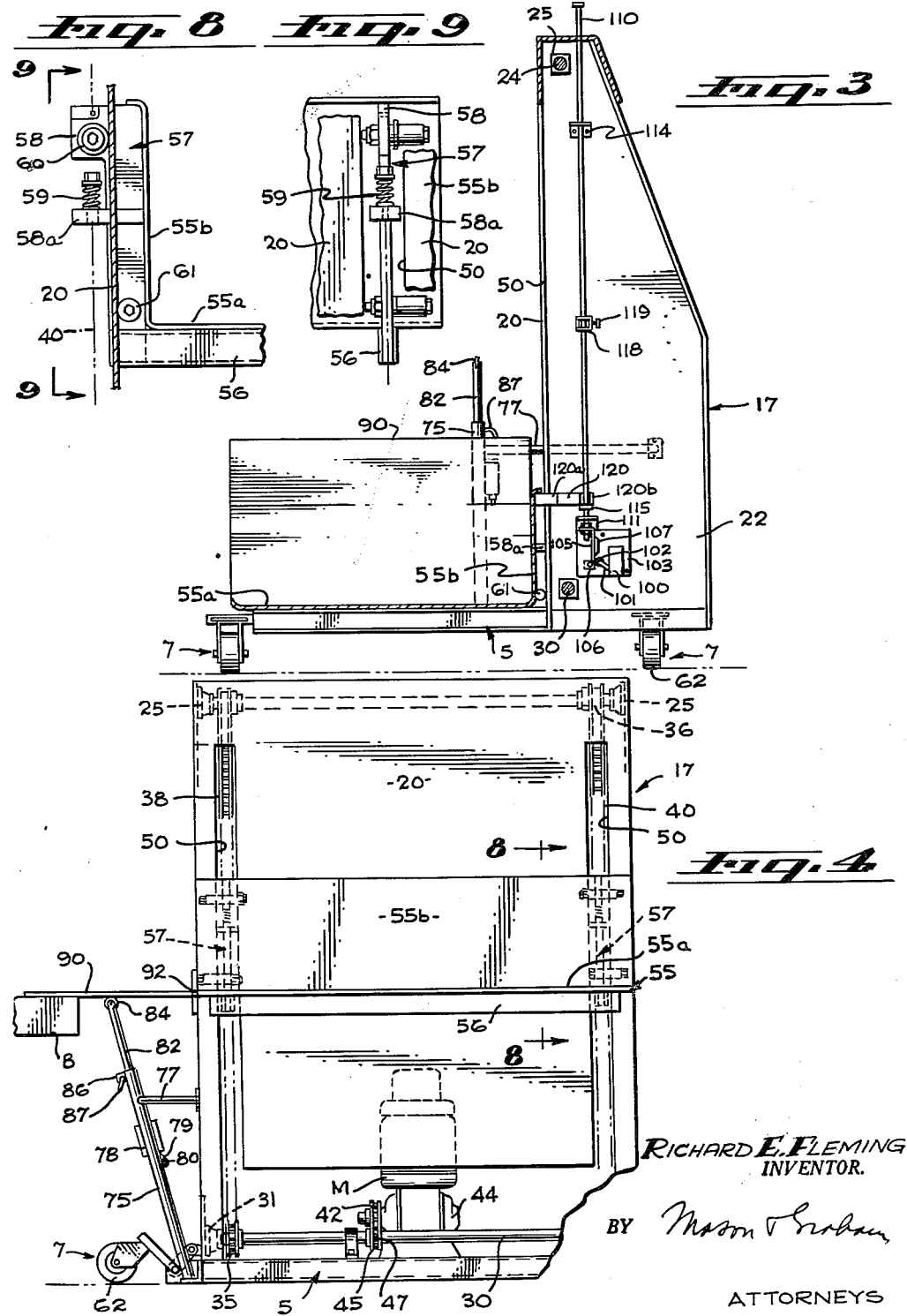

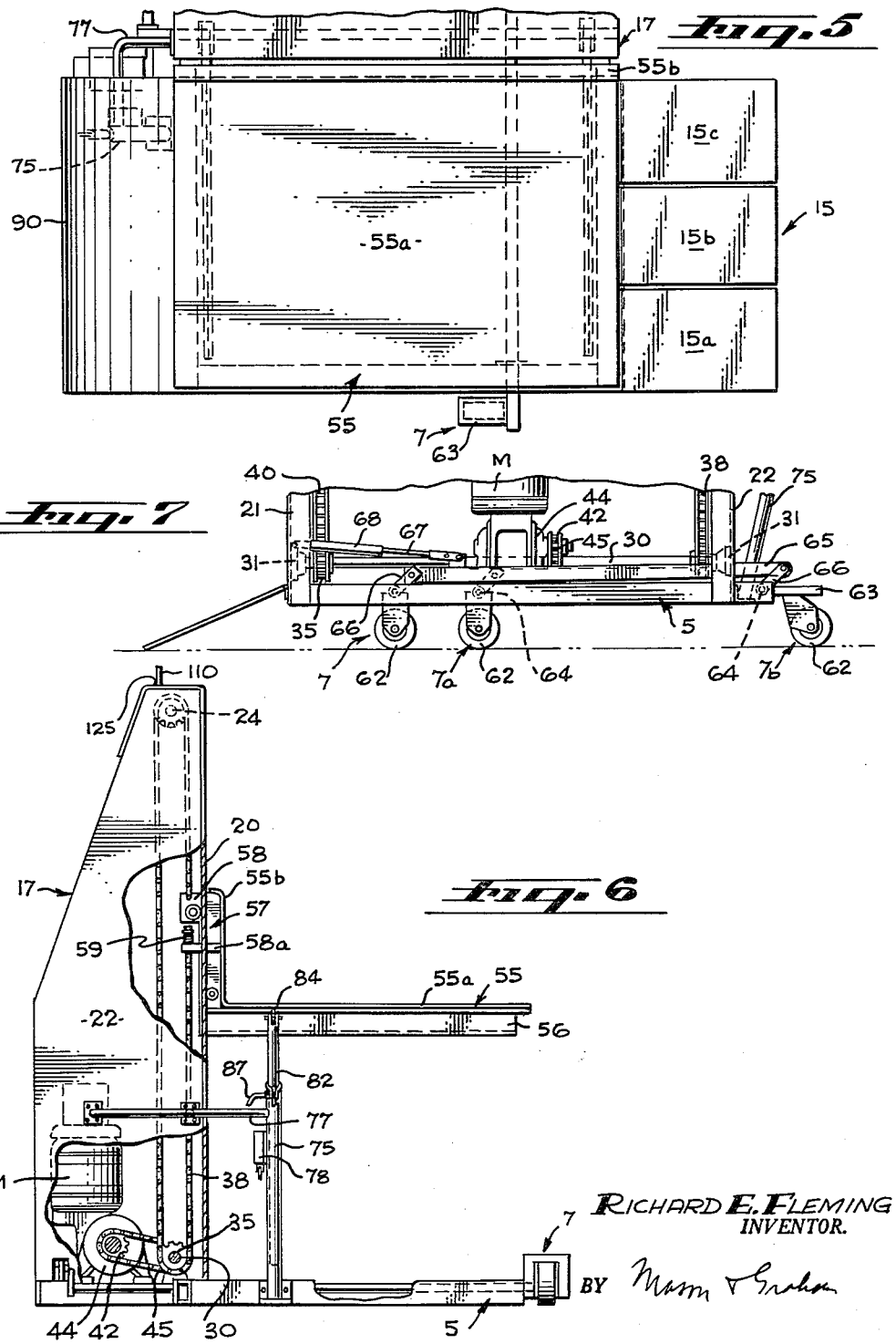

United States Patent Office 3,054,519
Patented Sept. 18, 1962

3,054,519
TRUCK LOADING ELEVATOR DEVICE FOR HANDLING HAND TRUCKS
Richard E. Fleming, Hawthorne, Calif., assignor to Tri-County Leasing Corporation, Redlands, Calif.
Filed Jan. 17, 1961, Ser. No. 83,238
7 Claims. (Cl. 214—512)

My present invention has to do with improvements in elevator devices for use in loading trucks, and, in its more particular aspects, relates to a portable elevator device which has a movable platform, a ramp at one side of the platform along which hand trucks loaded with merchandise may be rolled onto the platform when the latter is in lowered position; the platform being also provided at its side opposite said ramp with a novel switch actuating abutment plate which, when the operator of the hand truck pushes the hand truck against the abutment plate, causes the latter automatically to actuate a switch which energizes the motor to cause the platform to be raised to the level of the truck body being loaded. The device is also so constructed that, as the platform is being elevated, the abutment plate is guided into a position in which it forms a second ramp bridging the space between the platform and the truck being loaded and along which second ramp the hand truck may be moved onto the truck being loaded.

The most conventional manner of loading trucks from a warehouse or the like is to place a long, relatively steep, ramp from the floor or street level to the top of the load-carrying body of the truck being loaded, requiring that the loaded hand trucks be pushed up the long, steep ramp onto the truck. While elevator devices for use in loading trucks have been proposed, those of which I am aware have not been portable, so that they must be built into the loading wharf structure. Also, in such prior devices, the operator of the hand truck has to manually actuate the switch controlling the elevation and lowering of the elevated platform and has to manually adjust a ramp extending between the platform and the truck after the elevator platform has been raised.

It is an object of my present invention to overcome the disadvantages of prior loading devices and methods.

It is another object to provide an elevator device which may be rendered portable so that it may be moved onto the sidewalk or street to a point immediately adjacent the truck being loaded and may then be rendered immobile during the work of loading the truck.

Another object is to provide an elevator device of this character having a ramp at one side of the elevator platform and in which the elevator platform carries, at its opposite side, a hinged, swingable abutment plate to be engaged by the hand truck being used to transport the merchandise being loaded and, upon being so engaged, the abutment plate automatically actuates a switch to cause the elevator platform to be raised to the desired level of the truck-loading surface at which time movement of the platform is stopped by another switch actuated in response to movement of the platform.

An additional object is to provide, in conjunction with such an abutment plate, a guide member which guides the swinging movement of the abutment plate.

A still further object is to provide, in a device of this character, means for adjusting the height to which the elevator platform may be raised during any given loading operation, so that it may be adjusted to the varying heights of trucks being loaded.

Still further objects and corresponding advantages will appear hereinafter.

Figure 2:
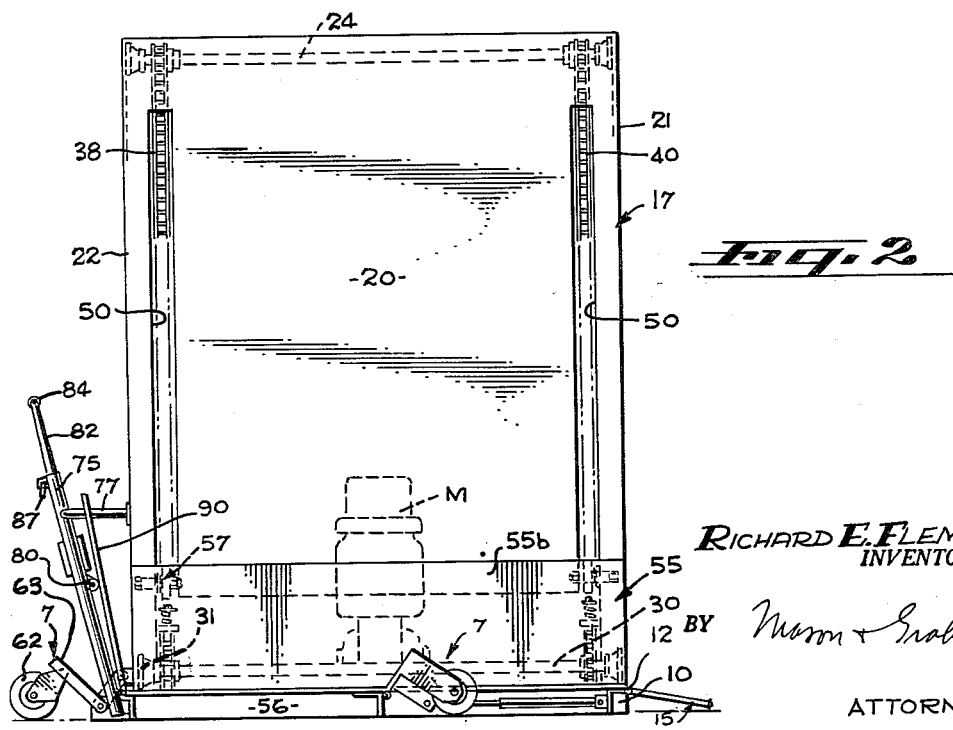

While I shall point out in the appended claims the features which I believe to be new, I shall now, for the purpose of enabling those skilled in the art to understand and practice my invention, describe in detail a presently preferred embodiment thereof, for which purpose I shall refer to the accompanying drawing wherein:

FIG. 1 is a rear elevation of my device;
FIG. 2 is a front elevation;
FIG. 3 is a section taken on line 3—3 of FIG. 1;
FIG. 4 is a fragmentary front elevational view showing the elevator platform in elevated position;
FIG. 5 is a fragmentary top plan view;
FIG. 6 is a side elevational view with parts broken away for illustrative purposes;
FIG. 7 is a fragmentary rear elevational view;
FIG. 8 is a fragmentary view taken on line 8—8 of FIG. 4; and
FIG. 9 is a fragmentary view taken on line 9—9 of FIG. 8.

Referring now to the drawings, the numeral 5 denotes an angle iron, rectangular base frame which is supported by three caster units 7 which, as will be hereinafter described, may be raised to render the device portable and may be lowered to immobilize the device. An angle iron bracket 10 is welded to a side of the base and has hingedly secured thereto, as by hinges 12, a divided ramp 15, consisting of three leaves 15a, 15b, 15c (FIG. 5). The ramp is thus divided to conform with uneven ground or floor surfaces.

The base carries an upright back unit 17 comprising a front wall 20 and side walls 21 and 22. An upper shaft 24 is journaled at its ends in bearings 25 carried by the side walls of the unit 17, and a bottom shaft 30 is journaled at its ends in bearings 31 likewise carried by the side walls. Two sprocket wheels 35, 36 are fixed on each of the respective shafts, and chain belts 38, 40 are trained over the sprocket wheels so as to be driven thereby.

An electric motor M, carried by the base, drives a sprocket 42 through a conventional gear reducing unit 44, and a chain belt 45 is trained over the sprocket 42 and a sprocket 47 fixed on shaft 30, which latter shaft is also journaled between its ends in a bearing member 48 carried by the base.

The front wall 20 of unit 17 has a pair of parallel, spaced, vertical slots 50 through which the link belts 38, 40 are exposed; and an elevator platform 55, having a horizontal portion 55a and a vertical portion 55b, is supported on an angle iron frame 56 which has a vertical extension 57 secured to the belts 38, 40 by the brackets 58, so that the platform is elevated and lowered in response to movement of the belts. One end of each of the belt is resiliently secured to the lower portion 58a of the latter brackets by means of a compression spring 59. Rollers 60, 61 carried by frame portion 57 engage opposite sides of wall 20 adjacent slots 50.

Each of the caster units 7, 7a and 7b comprises a wheel 62 carried by a bracket 63 pivotally secured, by pivot pin 64, to the base, so as to be swingable between the positions of FIGS. 1 and 3. The caster of unit 7b is mounted to swivel relative to its bracket 63. The brackets 63 are swung about their respective pivot pins by means of links 65 and levers 66, the links being actuated by a piston 67 reciprocally mounted in a pneumatic or hydraulic cylinder 68, the air or hydraulic pressure being supplied by a hand pump 70 having means, not shown, for releasing the pressure when it is desired to lower or immobilize the device. Thus the device may be rendered immobile by operating the pump to raise the caster units to the position of FIGS. 3 and 7 or may be rendered immobile by releasing the pressure to allow the caster units to lower to the position of FIGS. 1 and 2.

Secured at its bottom end to the base 5, as by welding, there is an angularly upright disposed tube 75 which is additionally supported by a tubular brace 77 secured to side 22. A motor control switch 78 is carried by the tube 75 and an actuating arm 79 projects from said switch and carries a roller 80 at its free end. A second tube 82 is telescopically adjustably mounted in the tube 75 and carries a roller 84 at its top end. The tube 82 may be fixed in any axially adjusted position relative to the tube 75 by means of the top end portion of the tube 75 being longitudinally split and having ears 86 which may be urged together by a bolt 87 to constrict about the tube 82.

An abutment plate 90 is hingedly connected at its bottom edge to the edge of the platform portion 55a by hinge 92, and when the platform is in its bottom or lowered position (FIG. 2), the abutment plate leans by gravity lightly against the roller 80 of the switch actuating arm 79 (FIG. 2). Circuit wires, not shown, connect the switch 78 to the motor M so that when the switch 78 is actuated, it energizes the motor to elevate the platform, the motor continuing to operate until the elevator has reached the desired elevation, at which time the circuit is opened automatically by means to be hereinafter described.

Thus, the operator, of a hand truck, not shown, pushes it up the ramp 15 onto the platform portion 55a and against the abutment plate 90; the pressure thus exerted on the abutment plate by the hand truck being pushed there against, actuates the spring loaded switch actuating arm 79 to close the circuit to the motor.

As the platform rises, the abutment plate is guided by the rollers 80 and 84 against which it bears by virtue of gravity, until the outer end of the abutment plate comes to rest against the truck body B, in which position the elevator platform, the abutment plate and the truck body are in substantially the same plane, the abutment plate providing a ramp bridging the space between the platform and the truck body. The hand truck operator then pushes his truck onto the truck body, unloads his cargo and returns the hand truck to the platform, after which he manually actuates an electric switch 95 at the top of the unit 17 to again energize and to reverse the motor M to low the platform to the position of FIGS. 1 and 2.

To adjustably control the height to which the elevator platform may be raised in a given operation, I provide a motor control switch 100, which is controlled by a spring-loaded actuating arm 101 carrying a roller 102 at its outer end. The switch 100 is carried by a wall plate 103. A slide plate 105 is slideably supported by bracket 106 mounted on the plate 103; the slide plate carrying a cam 107 which, when the slide plate moves downwardly, engages the roller 102 and causes the arm 101 to open the circuit controlled by the switch 100. In the position shown in FIG. 3, the cam is out of engagement with said roller so that the circuit is closed.

An actuating rod 110 has its lower end slideably extending through the right angular portion 111 of the bracket 105 and has its upper end portion slideably extending through a bracket 114 carried by side wall 22. The rod also carries a fixed collar 115 and a collar 118 which may be adjustable locked in position on the rod by a thumb screw 119. A bracket 120 has its inner end 120a fixed to the portion 55b of the platform 55 so that it travels with the platform, and has a looped outer end 120b which slides along the rod 110 to selectively engage the collar 115 or the collar 118.

The top end portion of the rod 110 may extend through a hole, not shown, in the top wall 125 of the unit 117

I claim:

1. A truck loading elevator device for handling hand trucks comprising, in combination, a base having a horizontal portion and an upright portion, a wall forming a part of said upright portion, said wall having a pair of transversely spaced, parallel, vertical slots therethrough, a pair of parallel, vertically spaced shafts carried by said base behind said wall, a pair of sprockets on each of said shafts, a pair of link belts trained over said sprockets and being exposed through said slots, an electric motor carried by said base, means operatively connecting said motor to one of said shafts, an electric circuit connected to said motor, a tubular post secured at its bottom end to said horizontal portion of said base and inclining upwardly and outwardly therefrom, a switch carried by said post for controlling said circuit, said switch having a spring loaded actuating arm carrying a roller at its outer end, a rod telescopically adjustably mounted in said post and projecting upwardly therefrom, said rod carrying a roller at its top end, an abutment plate hingedly connected to a side edge of said platform and normally leaning, by gravity against said first-mentioned roller with insufficient pressure to actuate said switch, and being disposed in position to be engaged by a hand truck on said platform, said abutment plate being operable in response to said engagement to move said actuating arm into position actuating said switch to close said circuit and thence moving on said rollers in response to vertical movement of said platform until said abutment plate is in a horizontal position.

2. The device of claim 1 which additionally includes three juxtaposed ramp-forming plates hingedly connected to said horizontal portion of said base opposite said abutment plate.

3. The device of claim 1 which additionally includes caster units hingedly connected to said horizontal portion of said base for swinging movement relative thereto, and fluid actuated means for so swinging said caster unit.

4. The device of claim 1 which additionally includes a manually operable switch for closing said circuit to cause said platform to be lowered.

5. In a truck loading elevator for handling hand trucks, a base, a hand truck receiving platform, means carried by said base and supporting said platform for vertical movement relative thereto, electrical means for vertically moving said platform, a tubular post secured at its bottom end to said base and inclining upwardly and outwardly therefrom, an electric switch carried by said base for actuating said electrical means, said switch having a spring loaded actuating arm carrying a roller at its outer end, a rod telescopically adjustably mounted in the top end of said post, a second roller carried by the top end portion of said rod, a normally uprightly disposed plate hingedly secured at its bottom edge to a side edge portion of said base in position to be engaged by a hand truck on said platform, said plate being operable when so engaged by said hand truck to actuate said switch to cause said platform to move vertically relative to said base, and said rollers being operable in response to said latter movement to guide said plate into substantially horizontal position extending laterally from said platform whereby to provide a hand truck ramp from said platform to an adjacently positioned truck.

6. In a truck loading elevator for handling hand trucks, a base, a hand truck receiving platform, means carried by said base and supporting said platform for vertical movement relative thereto, electrical means for vertically moving said platform, a post secured at its bottom end to said base at one side of said platform, an electric switch carried by said post and having a spring loaded actuating arm for actuating said electrical means to move said platform upwardly, an abutment plate hingedly attached at its bottom edge portion to the edge portion of said base adjacent said post, said abutment plate normally leaning by gravity against said actuating arm with insufficient pressure to actuate said electrical means and being movable against said arm with sufficient pressure to actuate said electrical means when said plate is engaged by a hand truck on said platform, and separate manually controlled switch means operable to actuate said electrical means to lower said platform; said abutment plate being swingably movable from said leaning position to horizontal position in response to upward movement of said platform.

7. The device of claim 6 wherein said post carries roller means for guiding said abutment plate from said leaning position into said horizontal position in response to upward movement of said platform.

References Cited in the file of this patent

UNITED STATES PATENTS

| 1,940,867 | James | Dec. 26, 1933 |
| 2,633,253 | Martin | Mar. 31, 1953 |
| 2,792,079 | Gibson | May 14, 1957 |

FOREIGN PATENTS

| 1,113,257 | France | Nov. 28, 1955 |
| 1,187,147 | France | Mar. 2, 1959 |